Sept. 20, 1966 P. F. MAEDER 3,273,896

TAPE RECORDER AND TAPE STORAGE MAGAZINE THEREFOR

Original Filed Feb. 17, 1960

6 Sheets-Sheet 1

INVENTOR.

PAUL F. MAEDER

BY

Dike, Thompson, Bronstein & Moore

ATTORNEYS

*INVENTOR.*

PAUL F. MAEDER

*BY*

Dike, Thompson, Bronstein & Mroz

ATTORNEYS

INVENTOR.
PAUL F. MAEDER
BY
ATTORNEYS

Sept. 20, 1966 P. F. MAEDER 3,273,896

TAPE RECORDER AND TAPE STORAGE MAGAZINE THEREFOR

Original Filed Feb. 17, 1960 6 Sheets-Sheet 4

INVENTOR.

PAUL F. MAEDER

BY

Dike, Thompson, Bronstein & Roese

ATTORNEYS

TAPE RECORDER AND TAPE STORAGE MAGAZINE THEREFOR

Original Filed Feb. 17, 1960 6 Sheets-Sheet 5

INVENTOR.
PAUL F. MAEDER
BY
Dike, Thompson, Bronstein & Mrose
ATTORNEYS

TAPE RECORDER AND TAPE STORAGE MAGAZINE THEREFOR

Original Filed Feb. 17, 1960

6 Sheets-Sheet 6

INVENTOR.
PAUL F. MAEDER
BY
Dike, Thompson, Bronstein & Mi...
ATTORNEYS

United States Patent Office 3,273,896

Patented Sept. 20, 1966

3,273,896

TAPE RECORDER AND TAPE STORAGE MAGAZINE THEREFOR

Paul F. Maeder, Rumford, East Providence, R.I., assignor, by mesne assignments, to Leesona Corporation, Warwick, R.I., a corporation of Massachusetts

Original application Feb. 17, 1960, Ser. No. 9,264, now Patent No. 3,155,335, dated Nov. 3, 1964. Divided and this application May 10, 1963, Ser. No. 279,397

4 Claims. (Cl. 274—11)

This application is a division of my U.S. application Serial No. 9,264, filed February 17, 1960, now U.S. Patent No. 3,155,335, which is a continuation-in-part of U.S. applications Serials Nos. 678,503 and 678,732, now U.S. Patents Nos. 2,945,697 and 2,945,692.

The present invention relates to a device, particularly an inertia compensated device, for recording intelligence on a tape, for example, a magnetic tape or a photographic film, of the type disclosed in my copending applications Serial Nos. 678,503 and 678,732 filed August 16, 1957, now U.S. Patents Nos. 2,945,697 and 2,945,692, and to a tape storage magazine in which said tape is adapted to be stored and which is adapted to be removably placed in such device.

Such devices preferably incorporate a closed loop of tape which is fully immersed in a liquid having a specific gravity closely approximating (preferably equal to) that of the tape and of certain moving parts of the tape transport mechanism which is also immersed in the liquid. Consequently, the device will function properly at the high acceleration and deceleration rates of modern missiles and aircraft.

The tape is stored in the form of a multi-layer bundle of coils spirally wound around each other. The tape is removed from the bundle, is moved over one or more intelligence transmitting heads and is subsequently guided back to the bundle. In order to meet storage space specifications of missiles and aircraft and still use a relatively long length of tape so as to achieve adequate recording time at relatively high tape speeds and in order to reduce the number of tape layers in the bundle required for a given length of tape, a bundle having unequal dimensions as distinguished from a circular bundle, is used. For example, the bundle in each of the above applications is wound around a pair of spaced rotatable reels, and consequently is elongated in shape (greater in overall length than in overall width).

It has been discovered that with such an arrangement, jamming and rough, erratic transport of the tape even at high speeds can be eliminated by constraining the dynamic thickness and shape of the bundle, especially between adjacent reels, to a maximum predetermined thickness and to a predetermined shape, preferably having a reverse bend, to thereby increase the tension on the bundle and prevent the moving multiple tape layers in the bundle from billowing and flapping with respect to each other.

This is achieved in accordance with the present invention by the use of a constraining member or members forming a well defined closed loop channel or track, preferably having a reverse bend, in which the bundle is located. However, with such an arrangement the width of the channel and hence the constraining members must be extensively modified to interchange tapes of different lengths (different recording times), which require bundles of different thicknesses and shape. This is impractical. It is also undesirable to require a different recorder for different recorder times. Therefore, in accordance with the present invention the above mentioned tape and tape bundle is stored in a magazine which can be removably placed in the recorder and is interchangeable with other magazines in which tapes of different lengths are stored.

The magazine is provided with a novel built-in tape guiding arrangement for guiding the tape from the inside of the bundle and out of the magazine and for guiding the tape back into the magazine to the outside of the bundle at an optimum point to insure against jamming and erratic, rough tape transport.

Erratic tape transport is further reduced by opposed means rising slightly above the floor of the channel in which the bundle is located and depending slightly below the top of the channel and engaging only small opposite portions of the lower and upper edges of the bundle to constrain the height of the bundle without danger of binding. Preferably the opposed surfaces of the vertical constraining means are curvilinear in the longitudinal direction of the channel to decrease the area of contact with the bundle.

It has also been discovered that feed back of noise to the electronic units due to mechanical flutter or frequencies introduced by the constant speed control of the capstan driving motor can be eliminated by the use of a capstant drive shaft having a high intertia mass in combination with an elastic coupling elastically coupling the source of power (motor) with the capstan shaft to thereby dampen out such flutter or frequencies above a predetermined cut-off frequency and the noise caused thereby.

It has also been discovered that by providing a recess of certain design and proportions in the tape engaging surfaces of the electronic heads, more intimate contact, and hence better transmission, can be achieved between the tape and surface.

Other objects and advantages of the invention will become apparent from the following description and accompanying drawings in which a specific embodiment of the invention is shown for illustrative purposes only and in which FIG. 1 is a plan view of a tape recorder embodying the present invention with the cover and liquid removed and the cover rotated 180° about its longitudinal axis to show the bottom thereof.

Figure 1:
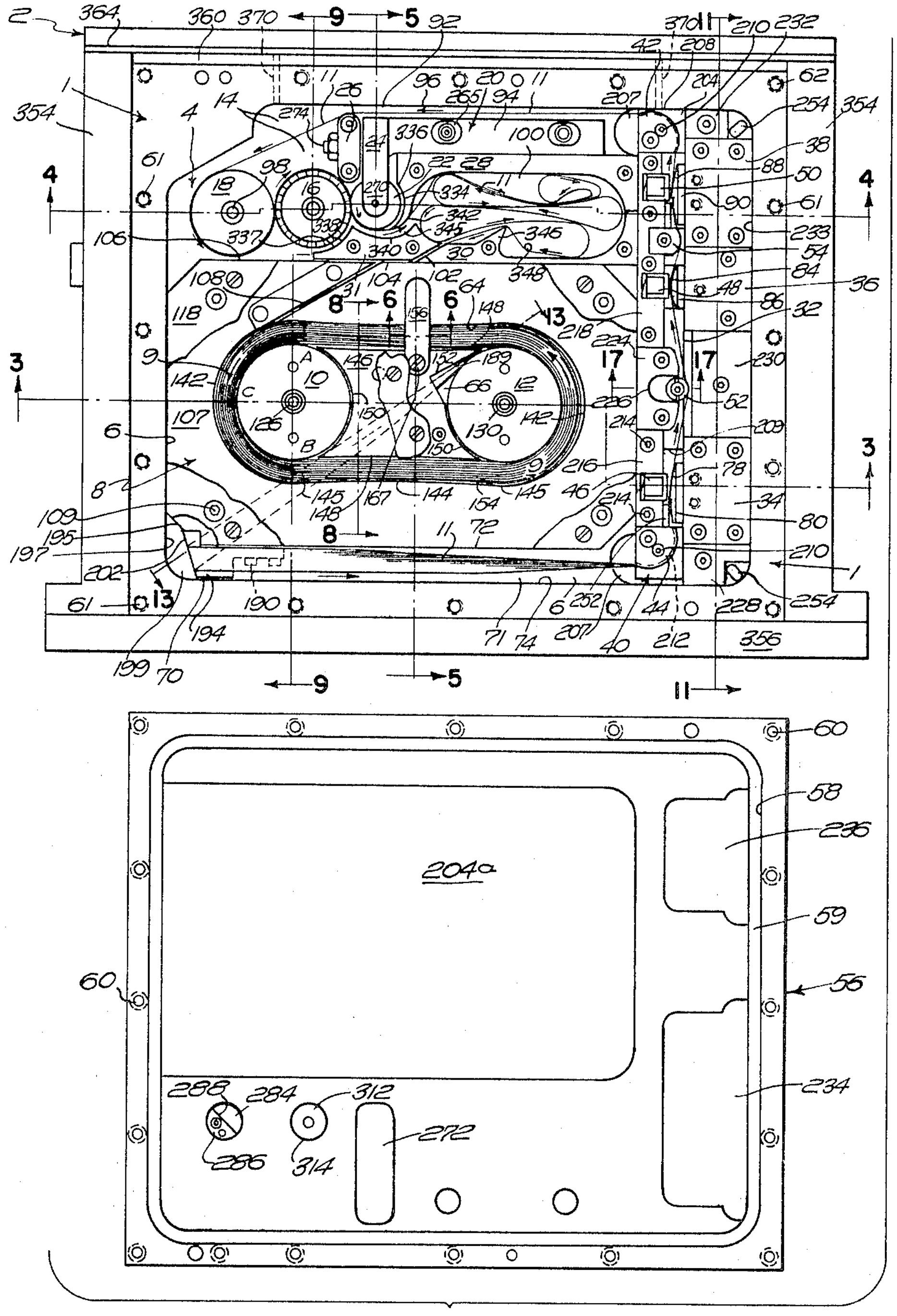

With reference to the figures, 2 is a tape recorder having a metal support plate 1 (FIGS. 1 and 2) to the top of which is secured the tape transport mechanism and to the bottom of which is secured the electronic components or units which do not form any part of the present invention.

Plate 1 has a tri level liquid proof cavity 4 (FIGS. 1 and 2) therein divided into (1) a tape storage magazine receiving portion 6 (FIG. 2) of one height, in which portion of the cavity is located the tape storage magazine 8 having located therein a multi-layer, spirally wound bundle 9 of coils of a continuous loop of tape 11, the bundle being wound around a pair of spaced reels 10 and 12 rotatably mounted in the magazine, (2) a tape transport mechanism receiving portion 14, which is of lesser height than the magazine receiving portion 6 (FIG. 2) and in which is located a rotating tape drive capstan 16, a rotatable idler roll 18 slidable away from and toward the periphery of capstan 16, an L-shaped yoke member 20 having a pressure roll 22 rotatably mounted on an arm 24 thereof and adjustably secured to the floor of the cavity portion 14 to adjust the position of pressure roll 22 with respect to the capstan, a yoke stop 26 secured to the floor of the cavity portion 14, and three tape guide fences 28, 30 and 31 secured to the floor of cavity portion 14, and (3) an intelligence transmitting head receiving portion 32 (FIG. 2) which is greater in height than the magazine receiving portion 6 and in which is located a reproduce head box 34 containing the reproduce head, an erase head box 36 containing an erase head, a record head box 38 containing the record head, such head boxes being secured to the floor of the cavity portion 32, and a guide bar 40 secured to the floor of such cavity portion for guiding the tape past the above mentioned heads and comprising corner tape guides 42 and 44, slidable spring biased pressure pad blocks 46, 48 and 50 opposite the reproduce head, the erase head and the record head respectively for urging the tape against the tape contacting surfaces of such heads as it moves past such surfaces, and tape guides 52 and 54 located between the heads and which cooperate with the corner guides 42 and 44 to retain the tape under tension over the head surfaces.

Cover 56 (FIG. 1) closes the cavity 4 in a liquid proof manner and is secured to the top of the plate 1 by means of screws passing through apertures 60 in the peripheral portion of the cover and into threaded apertures 61 in the peripheral portion of plate 1. The cover 56 has a groove 58 therearound for receiving an O ring 59 which provides a seal between the plate 1 and its cover 56. The sealed recorder cavity 4 is filled with a liquid having a specific gravity closely approximating, preferably equal to, the specific gravity of the tape so that all the parts within the cavity are fully immersed in such liquid. The recorder cavity 4 and cover plate 56 form a sealed chamber which is filled with liquid and is liquid proof.

Figures 2, 8:
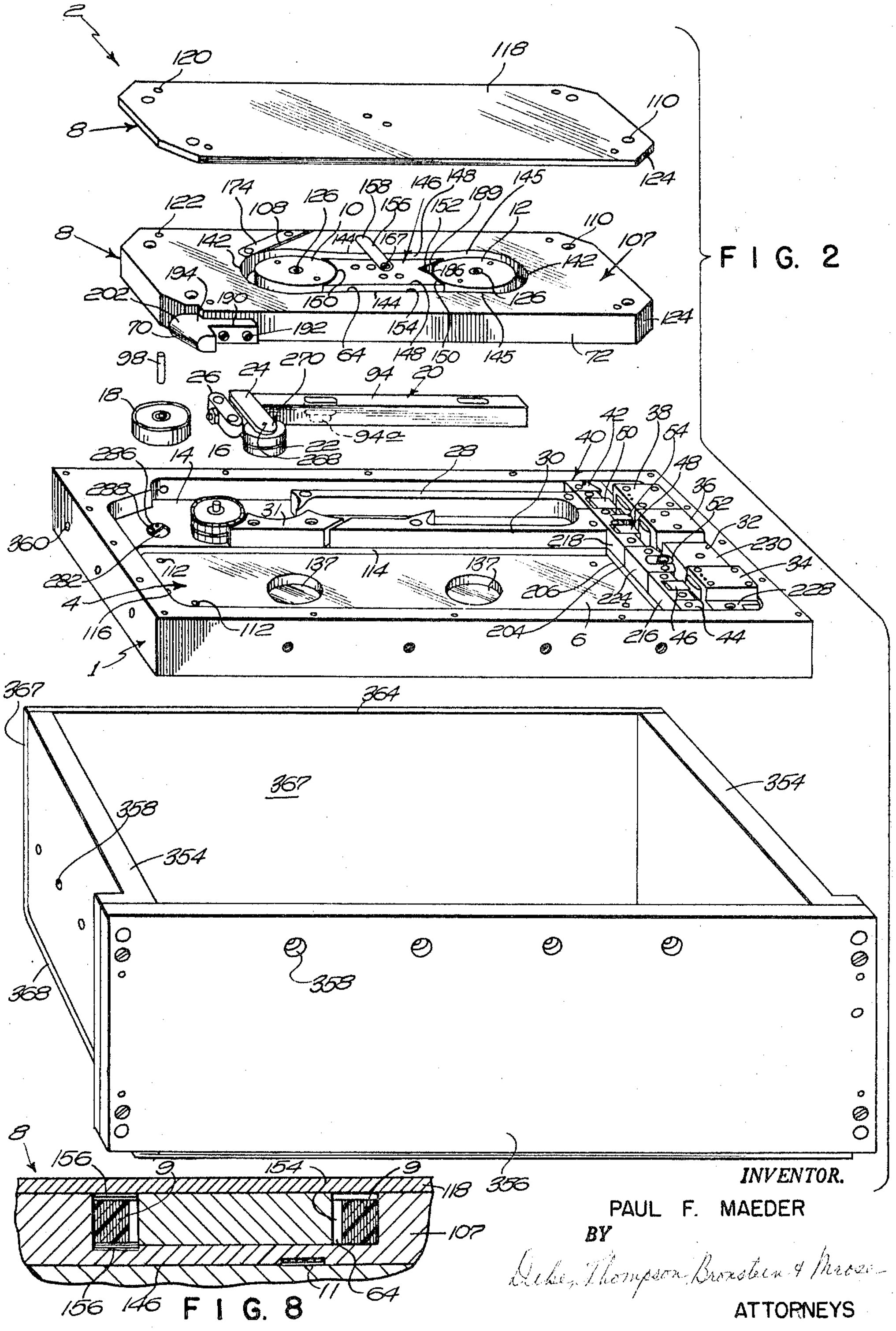
FIG. 2 is an exploded view in perspective of the recorder of FIG. 1.
FIG. 8 is a section taken along the line 8—8 of FIG. 1.
Figures 12, 14, 15, 16:
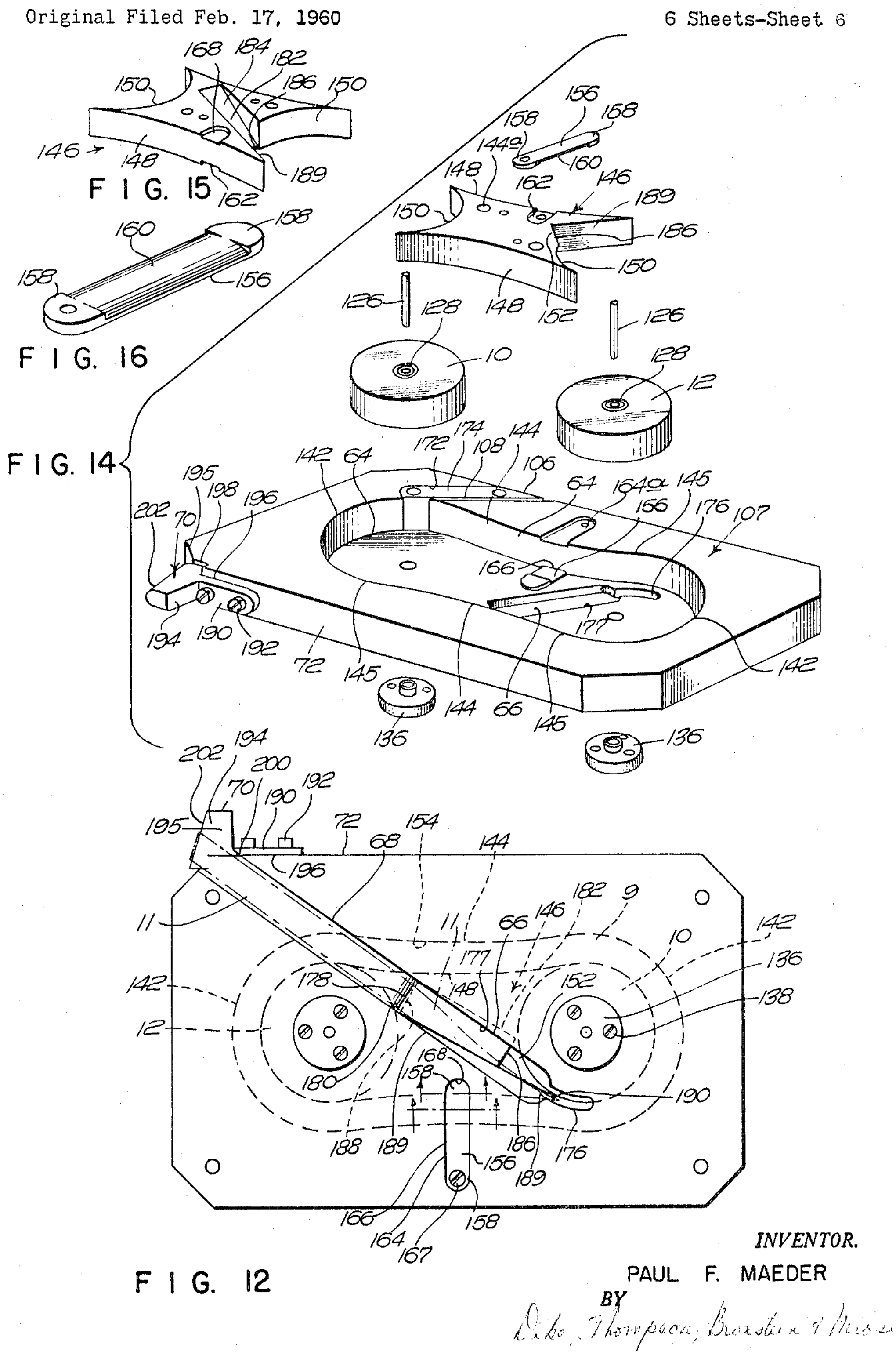
FIG. 12 is a bottom plan view of the magazine of FIG. 1.
FIG. 14 is an exploded view in perspective of the magazine of FIGS. 1 and 12.
FIG. 15 is a view in perspective showing the bottom of the center barrier of the magazine of FIG. 14 located between the reels.
FIG. 16 is a view in perspective showing the lower surface of one of the cross pieces in the magazine of FIG. 14 for constraining the vertical height of the bundle.

The tape bundle 9 is located in a cavity 64 in magazine 8 (FIGS. 1, 2 and 14). A center barrier 146 is located between the reels 10 and 12 and is secured to the floor of the magazine cavity 64, the bundle being located around the reels and center barrier. The inner tape layer 11 of the bundle is guided away from the inside of the bundle 9 partially around the portion of the periphery of reel 12 facing barrier 146 (FIG. 1), thence downwardly through an elongated, rectangular shaped aperture 66 (FIGS. 1, 3, 5, 12 and 14) in the floor of the magazine cavity 64 to the outside of the magazine, and thence through an elongated groove 68 in the bottom outside face of the magazine opposite the floor of cavity 64, to a guide 70 secured to an edge 72 of magazine 8 and extending outwardly and horizontally from such edge 72. Guide 70 changes the attitude of the tape from vertical in the bundle to horizontal and also changes the direction of travel of the tape from the direction of the longitudinal center line of the elongated aperture 66 and groove 68, which is generally diagonal with respect to the rectangular shaped magazine, to a new direction which is parallel to the longitudinal center axis of the magazine.

The tape continues from guide 70 in the above-mentioned new direction through a tape passage 71 (FIG. 1) formed by longitudinal edge 72 of the magazine and a vertical wall 74 of the recorder cavity portion 6 to corner guide 44 which changes the tape attitude from horizontal to vertical again and also changes the direction of tape travel about 90°. The tape then continus in its new direction through a passage 76 between the head boxes 34, 36 and 38 and the guide bar 40, which guide bar extends nearly across the width of the recorder cavity 4 and forms a partition between the magazine receiving portion 6 and transport mechanism receiving portion 14 of such cavity and the head receiving portion 32. The tape first passes over the tape engaging surface 78 of the reproduce head 80, the front portion of which head protrudes from an opening in the reproduce head box 34. The spring biased, slidable pressure pad 46 presses the tape against surface 78 as it passes over the surface. From reproduce head 80 the tape moves over the guide 52 and thence in front of the tape engaging surface 84 of erase head 86, the front portion of which head protrudes from an opening in the erase head box 36. The slidable, spring biased pressure pad 48 presses the moving tape against tape surface 84. From the erase head 36, the tape moves over the guide 54 and thence in front of the tape engaging surface 88 of record head 90, the front portion of which protrudes from an opening in the record head box 38. The spring biased slidable, pressure pad 50 presses the tape against the surface 88 as it moves by the surface.

From the record head the tape 11 moves around corner guide 42 at the other end of the guide bar 40 through a passage 92 formed by the outer edge of the arm 94 of L-shaped yoke 20 and the vertical wall 96 of the recorder cavity portion 14 opposite the wall 74. The tape moves out of passage 92 and thence around the idler roll 18 which is rotatably and slidably mounted in the floor of recorder cavity portion 14 and the cover plate 56 by means of a floating, slidable pin 98. Idler roll 18 is slidable in a direction from left to right as viewed in FIG. 1 against the periphery of the tape drive capstan 16. The tape 11 continues around a substantial portion of the periphery of roll 18, thence between such periphery and the periphery of the driven, rotating capstan 16 and thence around about one half of the capstan periphery and between such capstan periphery and the periphery of the pressure roll 22 rotatably mounted on arm 24 of the adjustable yoke 20. The yoke 20 is adjustably secured to the floor of recorder cavity portion 14 so that the periphery of the pressure roll 22 presses the tape tightly against the periphery of the capstan to thereby drive the tape. Because the tape is wrapped about a large portion of the periphery of idler roll 18, longitudinal movement thereof by the capstan, as aforesaid, urges the roll 18 toward the capstan periphery to tightly press the tape against the capstan periphery and thereby aid in driving the tape. Thus the tape is pressed tightly between the peripheries of the pressure roll 22 and the capstan and between the peripheries of the idler roll 18 and the capstan. The rotating capstan 16 pulls the tape from the inside of the bundle along the aforesaid path.

The tape moves from between the capstan 16 and pressure roll 22 partially around roll 22 into an expansion chamber 100 formed by the tape guide fences 28, 30 and 31, where it is freed from tension and in which a length thereof is permitted to expand into a random, slack shape. From the expansion chamber 100 the tape moves through a slit 102 formed by opposed end edges of the fences 30 and 31 and thence through a slit 104 between the longitudinal side edge 106 of the magazine opposite from side edge 72, and the edge of fence 31 and thence through the slit 108 in the magazine 8 back to the outside of the bundle 9.

The magazine 8 comprises a flat rectangular plate 107 (FIGS. 1, 2 and 14) removably secured to the floor of the magazine receiving portion 6 of the recorder cavity 4 by inset screws 109 extending through four stepped holes 110 (FIG. 2) in the corners of plate 107 and its cover plate 118 and threaded into threaded apertures 112 in the floor of cavity portion 6 with the lower flat face of the magazine (plate 107) resting on and abutting against the flat floor of the recorder cavity portion 6, with the longitudinal side edge 106 of the magazine abutting against the shoulder 114 formed by the change in level of cavity portion 6 and the tape transport mechanism receiving cavity portion 14 and against the fences 30 and 31 (see FIGS. 1 and 2), with one end edge abutting against the side wall 116 of cavity portion 6, with the other end edge abutting against the back of guide bar 40 and flush with the shoulder 206 formed by the difference in level between the head receiving portion 32 and the magazine receiving portion 6 of the recorder cavity 4, and with the other longitudinal edge 72 spaced from wall 74 of the recorder cavity 4, as shown.

The magazine cavity 64, in which the bundle 9 of tape is located, is in the upper face of plate 107 and is elongated as shown. Cover plate 118, secured to the top face of the plate by means of inset screws extending through stepped holes 120 (FIG. 2) in the cover plate and threaded into threaded apertures 122 in the plate 107, closes the cavity 64. The corners of the plate 107 and cover 118 are beveled at 124.

Each of the reels 10 and 12 comprise an aluminum, inverted cup-shaped hollow cylinder 134 (see FIGS. 3 and 9) with a hollow center hub 128 forming a center aperture through the reel in which is pressed a brass bushing 130, which is slightly greater in height than the hub 128 and reel and has reduced end portions 131 which protrude slightly beyond the top and bottom surfaces of the reel, as shown. The inside of the reel between the hub 128 and cylinder 134 is filled with a plastic material 132 and a pair of apertures 133 extend through the reel. The reels 10 and 12 are rotatably mounted at the ends of the magazine cavity 64 on pins 126 which extend upwardly from the floor of the magazine cavity into the cavity and are rotatably received in bushings 130. Pins 126 are press fitted into center apertures in discs 136 located outside the cavity 64 and secured to the bottom surface of the magazine by three screws 138. Discs 136 have raised center hubs 140 through which the center apertures thereof extend and which are press fitted into apertures extending through the floor of the magazine cavity 64, the end portions of the hubs 140 being flush with the floor of the magazine cavity 64, as shown. Since the pins 126 are fixed in discs 136 and the discs are fixed to the floor of magazine cavity 64 the pins 126 are fixed in the floor of the magazine cavity. The heights of the reels 10 and 12 (exclusive of bushings 130) are slightly less than the height of the magazine cavity 64 between the cavity floor and the cover plate 118, to thereby provide clearance between the reels and the floor of the cavity and between the reels and the cover plate 118. The reels are vertically supported by engagement of the lower reduced bearing ends of their bushings 130 with the bearing ends of hubs 140 of discs 136 and by engagement of the upper reduced bearing ends of the bushings 130 with the cover member 118, the heights of the bushings 130 closely approximating the height of magazine cavity 64, but being such with respect to the height of the cavity that the reels are freely rotatable on the pins at all attitudes. The discs 136 attached to the bottom of the magazine are received in recesses 137 (FIG. 2) in the floor of the magazine receiving portion 6 of the recorder cavity 4.

The end portions 142 (FIGS. 1, 2 and 14) of the wall of the magazine cavity 64, which end portions lie opposite and adjacent to the peripheries of reels 10 and 12, each has substantially the same contour as the portion of the periphery of the reel which it faces and forms a circular arc spaced from such portion of the reel periphery and having as its center the center axis of the reel, so that such portion of the reel periphery and such arcuate end portion of the cavity wall form concentric arcs about the center axis of the reel (the center axis of the pin 126). Each such arc 142 is slightly greater than a half circle. The side portions 144 of the wall of the magazine cavity 64 between and joining such arcuate end portions 142 curve slightly inwardly, as shown, in the form of a circular arc having a substantially greater radius than the arcs 142, the curvature of the arcuate side portions 144 being reverse to the curvature of the arcuate end portions 142. The ends of arcs 144 join the ends of arcs 142 to form four reverse bends or curves 145. Put in another way, the joinder of the two sets of arcs 142 and 144 form continuous, reverse curves as shown.

The center barrier 146 (see FIGS. 1, 2 and 14) located between the spaced rotatable reels 10 and 12, as shown, is secured to the floor of the magazine cavity 64 by means of inset screws extending through stepped holes 144 (FIG. 14) in the barrier and threaded into threaded apertures in the floor of the cavity. The height of the barrier 146 is the same as the height of the magazine cavity 64 so that the flat top of the barrier is flush with the top surface of plate 107 and the bottom surface of cover plate 118 rests flush on the top of the barrier, the flat lower surface of the barrier resting flush on the floor of the magazine cavity 64. The side walls 148 of the barrier 146 extend closely to and between the peripheries of reels 10 and 12 and are substantially parallel to the sides 144 of the magazine cavity 64 so that they are curved inwardly and each of them forms a circular arc from end to end spaced inwardly from its opposed, arcuate side wall 144 and having the same center as such side wall 144, as shown. The curvature of each side wall 148 of the barrier is reverse to the curvature of the periphery of each of the reels 10 and 12 between which it extends so that the end portions of side walls 148 adjacent the reel peripheries from which such side walls extend, form with such peripheries four reverse bends which are substantially parallel to the reverse bends in the magazine cavity wall. The ends of the side walls 148 of the center barrier are spaced very slightly from the reel peripheries from which they extend to provide sufficient clearance for free rotation of the reels, such space being wide enough to accommodate the tape thickness and still permit free rotation of the reels.

The end walls 150 of the center barrier 146 have substantially the same arcuate contour as the portions of reels 10 and 12 facing such end portions, except for a V-shaped recess 152 in the end wall 150 adjacent reel 12, and are closely spaced to such portions of the reel peripheries, the space between the end wall 150 of the barrier and such portions of the reel peripheries being just wide enough so that they do not contact each other but slightly wider than the thickness of the tape 11. One wall 189 of the V-shaped recess or notch 152 extends to the end of a side wall 148 of the center barrier adjacent reel 12, as shown in FIGS. 1, 2 and 14, and forms a relatively sharp angle with such side wall, as shown.

The walls 142 and 144 of the magazine cavity 64, the reel peripheries 10 and 12 facing such walls, the side walls 148 of the center barrier 146 and the floor of the magazine cavity 64 form a closed loop channel or track 154 in which the tape bundle 9 is located and having four reverse bends therein corresponding to the reverse bends of the wall of the magazine cavity and the reverse bends formed by the reel peripheries and side walls 148 of the center barrier, the walls of the track being curvilinear throughout its length. The width of such channel 154 is sufficiently greater than the sum of the thicknesses of the tape layers of the bundle to insure against binding of the longitudinally moving layers, but is small enough so that the walls of the channel constrain the maximum dynamic width or thickness and shape of the bundle during operation of the recorder to the width of the channel and a shape having four reverse bends corresponding to the reverse bends of the channel. The smaller the width of the channel the better so long as it is wide enough to permit the tape layers to move longitudinally without excessive binding. Good results have been achieved where the width ($w$) of the channel in inches is equal to .00232 times the length of the tape in inches plus 0.0696 (the thickness of the tape being about .002 inch), where the radius of the sides 144 is 9.0 minus the width of the channel in inches and where the radius of the walls 142 is 0.6125 plus the width of the channel in inches. Where the diameters of the reels are changed for the same length of tape, thereby necessitating a different radius for walls 142, the radius of walls 144 and the width of the cavity may be changed proportionally. However, the invention is not limited to any particular channel width or radii of walls 142 and 144 or tape thickness.

During operation of the recorder, the outside of the tape bundle at its ends is spaced inwardly slightly from the end walls 142 of the channel 154 whereas the inside of the bundle at its ends bears against the reel peripheries due to the tightening effects on the bundle of the rotating reels. The inside of the bundle at its sides is spaced slightly outwardly from the walls 148 of the channel whereas the outside of the bundle at its sides bears against the walls 144 due to the fact that the walls 144 deflect or bias the bundle inwardly from a straight line path between the reels to thereby provide the reverse bends in the bundle and place the side portions of the bundle under tension along their length.

The bundle has a tendency to tighten around the reels so that the portions of the bundle opposite the reel peripheries are relatively tight around the reels in any event. However, during operation of the recorder, especially in liquid and at high speeds, the tape layers of the side portions of the bundle between the reels, if not constrained as set forth above, have a tendency to separate from each other and to bulge and billow outwardly and inwardly with respect to each other to cause a varying slack and flapping of the individual layers with respect to each other. This causes erratic and non-uniform transport of the tape layers with respect to each other, which causes tape jamming and improper performance. By constraining the dynamic width of these side portions of the tape and forcing the bundle to assume a dynamic shape having reverse bends, this is avoided. The reverse bends place these portions of the bundle under tension, which avoids the abovementioned unsatisfactory effects.

The dynamic width and shape of the bundle has been referred to above. The side portions of the bundle are deflected or biased inwardly by walls 144 and hence the bundle is forced to assume a shape having reverse bends corresponding to those of the channel when the tape is at rest as well as during operation of the recorder. However, it is the dynamic effects, as set forth above, which are important.

Although, in the drawings, the cavity wall deflects the side portions of the bundle to place them under tension and provide the reverse bends in the bundle, the same effect can be achieved by guide pins or protuberances spaced along the bundle. Also, the sides of the bundle may be deflected outwardly instead of inwardly to place them under tension.

Figure 6:
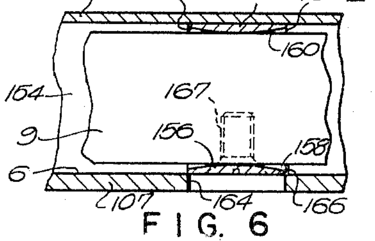
FIG. 6 is a section taken along the line 6—6 of FIG. 1 and FIG. 5.
Figure 7:
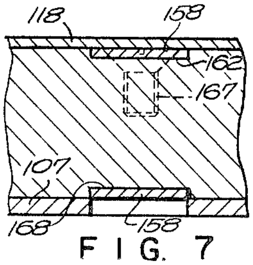
FIG. 7 is a section taken along the line 7—7 of FIG. 5.

The vertical heights of the reels 10 and 12 are slightly less than the height of the channel 154 and the width (the height when vertically disposed) of the tape 11 and hence the height of the bundle 9 are slightly less than the height of the reels and therefore are less than the height of the channel 154. A thin elongated strip 156 of metal or other material (FIGS. 1, 2, 5, 6, 7, 14 and 16) extends across a small portion of the top of the channel 154 between the reels. The top surface of the strip 156 is flat. The lower surfaces of the end portions 158 of the strip are also flat (FIGS. 7 and 16) but the lower surface 160 (FIGS. 6 and 16) between such end portions is arcuate in the direction of the width thereof, the lowermost point of the arc being about flush with the lower flat surfaces of the ends 158 of the strip. The ends 158 of the strip 156 are received in recesses 162 and 164 of equal height in the top of the barrier 146 and plate 107 respectively (FIG. 14), such recesses extending to the walls 148 and 144 respectively of the channel. Consequently, the lower arcuate surface 160 of the strip is below the top of the cavity channel 154, the arc being in the longitudinal direction of the bundle 9. The flat top of strip 156 is flush with the top of plate 107 and the strip is secured in place in the recesses by an inset screw 167 (FIG. 2) extending through a beveled aperture in an end portion 158 thereof into the floor of the recess 162 in the center barrier 146.

Figure 5:
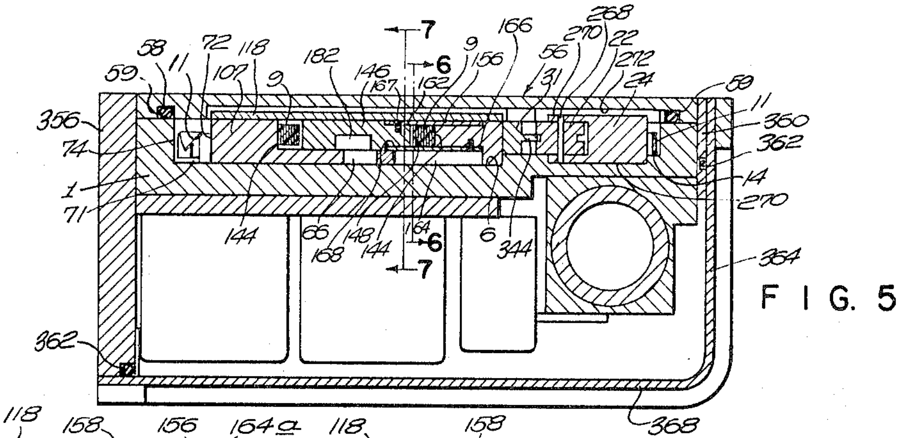
FIG. 5 is a section taken along the line 5—5 of FIG. 1.

Opposite the above-mentioned strip 156 is another strip 156 of like construction which is received in an elongated slot 164 (FIGS. 5, 7 and 12) in the lower surface of the plate 107, which slot extends laterally across the floor of the cavity channel beyond the vertical walls 144 and 148 thereof and upwardly slightly beyond the channel floor so that a portion of the channel and a portion of the lower face of barrier 146 adjacent wall 148 and overlying such slot are exposed from the bottom. The portion of slot 164 extending above the floor of the channel 154 is indicated as 166 in FIGS. 5, 12 and 14. A complementary recess 168 is located in the portion of the lower face of barrier 146 exposed by slot 164 and lying on the opposite side of the channel cavity from 166, such recess 168 extending laterally to the wall 148 of the barrier and also extending laterally in an opposite direction slightly beyond the slot 164 (FIG. 5). The floors or ceilings of 166 and the recess 168 are at the same level. The flat ends 158 of lower strip 156 are received in recesses 168 and 166 in the barrier and plate 107 respectively with the arcuate face 160 facing upwardly and being located slightly above the floor of the cavity channel 154. A portion of one end (left end as viewed in FIG. 5) of the lower strip 156 iis located between the floor or ceiling of recess 168 an the portion of the floor of the magazine cavity 64 under such recess, as shown in FIG. 5. The lower strip 156 is secured in place by an inset screw 167 (see FIG. 12) extending through a beveled aperture in an end 158 of the strip and threaded into a threaded aperture in the floor of 166 (slot 164) in the plate 107.

The two strips 156 constrain the vertical height of the tape bundle. The vertical distance between the arcuate surfaces 160 closest to each other is about the same as the height of the bundle but is large enough to permit the layers of the bundle to move freely longitudinally without binding, the contact between the tape edges and the arcuate surfaces being a light contact. These arcuate surfaces comprise vertical bearing surfaces for the bundle. Because of the small width of the strips and the arcuate bearing surfaces 160 the area of contact with the tape is reduced to a minimum to thereby keep friction between the tape bundle and the arcuate surfaces 160 at a minimum while still performing a vertical constraining function.

The tape return slit 108 (FIGS. 1 and 14) in the plate 107 is tangent to the arcuate wall 142 of magazine cavity 64 at a point opposite a point on the portion of the periphery of reel 10 traversed by the bundle 9, which last mentioned point is located in the first half of such peripheral portion traversed by the bundle. The portion of the periphery of reel 10 traversed by the bundle 9 (the direction of travel of the tape layers in the bundle being shown by arrows in FIG. 1) is located between points A and B in FIG. 1. The first half of such peripheral portion traversed by the bundle is AC. The above-mentioned point on the reel periphery is between AC and is relatively close to A. It is at this point that the tape returns to the channel cavity 154 and to the outside of the bundle. The angle between the slit 108 and the longitudinal center axis of the magazine connecting the centers of pins 126, is acute. In the drawings this angle is about 30°. The slit 108 is formed by a slot 172 in the top of plate 107 (see FIGS. 9 and 14), the floor of which slot is flush with the floor of the cavity channel. The slot extends from the outer longitudinal edge 106 of the magazine to the magazine cavity 64 and has a plug 174 secured therein by inset screws, the slit 108 being formed by an edge of the plug and an edge of the slot. The advantage of locating the tape return as aforesaid is as follows: The bundle is usually wound relatively tightly around the first half AC of the periphery of reel 10 because at this portion of the periphery it is being pulled onto the reel. Consequently, by returning the tape to this portion billowing of the returned layer and hence jamming and erratic tape transport is avoided. It insures that the tape layer will be returned to the outside of the bundle smoothly.

Figure 13:
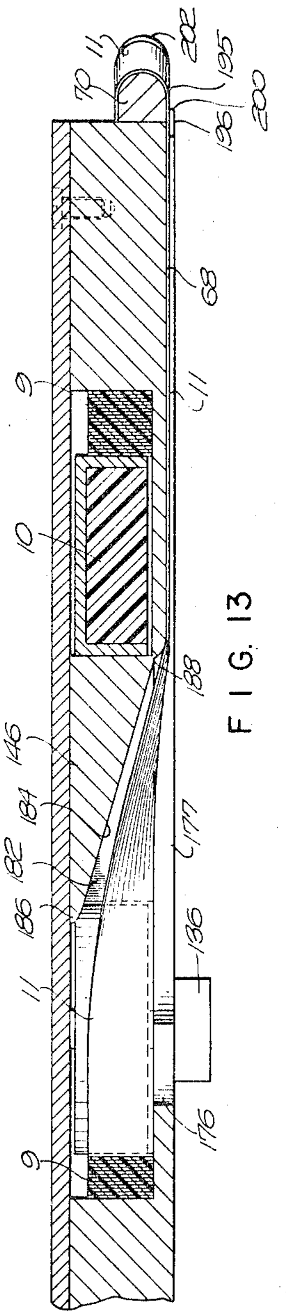
FIG. 13 is a view along the line 13—13 of FIG. 12.

The periphery of the tape take-off reel 12 has a slight (1 degree) taper tapering inwardly from top to bottom so that the top has a slightly greater diameter than the bottom. The elongated rectangular slot or aperture 66 through the floor of magazine cavity 64 of the magazine has an arcuate end portion 176 (FIG. 12) of reduced width located under a portion of the periphery of reel 12, the end of such arcuate reduced end portion 176 being located under a point on such reel periphery before it rotates into opposed relationship with end wall 150 of the barrier, which point is located opposite the end wall 142 of the recorder cavity just before it forms a reverse bend with side wall 144. The reel periphery lies over the arcuate center line of the arcuate end portion 176, and hence, together with the inner layer of tape adjacent such periphery, is exposed from the bottom of the magazine. The curved end portion 176 extends from the end thereof over an arc of about 45° to the juncture thereof with the straight enlarged portion 177 of the slot 66 (FIGS. 12 and 14) and is located below the reel periphery as it begins to rotate into opposed relationship with the end wall 150 of the barrier. Such juncture is located below a point on the reel periphery opposite the end wall 150 of barrier 146 facing such periphery soon after such point rotates into opposed relationship with such end wall and close to the side 148 of the barrier. The straight enlarged portion 177 of slot 66 is located at an angle of about 35° with respect to the line connecting the center axes of the pins 126 on which the reels 10 and 12 are rotatably mounted. The longitudinal center line of such straight part 177 of the slot 66 is substantially parallel to a line which is substantially tangent to the periphery of reel 12 at the point thereof located over the juncture of the straight part of the slot 66 with the curved end portion 176. The end portion of the enlarged straight part 177 of the slot adjacent the curved end portion 176 lies under a part of the reel 12 and its periphery thereby exposing them from the bottom of the magazine. The slot 66 ends at 178 (FIG. 12) where it continues in a straight line into straight groove 68 in the bottom of the plate 107, which groove in turn extends to the bevelled corner of the magazine which is located the furthest from the tape take-off point on the reel 12. The end portion of groove 68 adjacent the end of the slots 66 has an upward curvature at 180 (FIGS. 12 and 13).

The slot 66 is located under the barrier 146. The bottom surface of such barrier generally opposite the slot has an elongated, rectangular recess 182 (FIGS. 3, 12 and 13) therein, an end of which is in the end wall 150 facing reel 12. The ceiling 184 (FIGS. 3 and 13) of the recess 182 is inclined from end to end. It extends from the top surface of the end wall 150 of the barrier facing reel 12 at 186 (FIGS. 1, 2, 3, 12 and 14) downwardly to the lower surface of the barrier at 188, such lower end 188 being approximately over the end 178 of the slot 66. The end 186 forms a wall of the V-notch 152 in the end face 150 of the barrier facing reel 12, the other wall 189 of the V-notch being a continuation of a vertical wall of the recess 182 in the barrier. The recess 182 is located generally over the slot 66 but its longitudinal center line is at a slight angle with respect to the longitudinal center line of the slot. The longitudinal center line of recess 182 in the bottom of the barrier extends at an angle of about 30° with respect to the line connecting the center axes of pins 126 so that it is at an angle of about 5° with respect to the slot 66 and groove 68. A portion of the center barrier 146 adjacent vertical wall 189 extends beyond the corresponding longitudinal wall or edge of slot 66, including the edge of a portion of the curved end portion 176 adjacent the enlarged straight part of the slot, as shown in FIG. 12, so that such wall 189 lies over the slot and is exposed from the bottom of the magazine. This is the wall which forms a vertical wall of the V-shaped notch 152 cut in the barrier. The other longitudinal vertical wall of recess 182 in the barrier lies over the floor of the magazine cavity 64 adjacent the corresponding longitudinal edge of the slot 66. The edge 186 of the V-notch 152 forming the end of recess 182 is at a right angle to the longitudinal center line of such recess and to the vertical wall 189 of the notch 152 and recess 182. The wall 189 extends to the end of adjacent side 148 of the barrier 146 and intersects such side at a sharp angle as shown. It extends along the periphery of reel 12 closely adjacent thereto to form with the periphery a slit 190 (FIGS. 2 and 12) for guiding the inner layer of tape away from the inside of the bundle and partially around the portion of the periphery of reel 12 facing the barrier 146 before it (the tape) is pulled downwardly through the slot 66 in the floor of the magazine cavity 64 under barrier 146 and through recess 182 in the bottom face of the barrier and thence through groove 68 to guide 70. Wall 189 is parallel, and closely spaced, to a line which is tangent to the periphery of reel 12 at a point where it begins to rotate away from the bundle into opposed relationship with end wall 150 of the barrier.

The inclined recess 182 in the bottom of the barrier permits the required twisting of the tape in changing from a vertical attitude in the bundle to a horizontal attitude in the groove 68. The arcuate reduced end 176 of the slot insures against binding of the inner tape layer against the floor of the magazine cavity as it is drawn downwardly and twisted as set forth above. The groove 68 and the opposed floor of magazine cavity 64 provide a passage for the tape. The slight taper in the periphery of reel 12 aids in guiding the tape downwardly away from the reel. The widths of the wide part 66 of the slot and of the groove 68 and of the recess 182 are about the same and are substantially greater than the width of the tape.

Guide 70 comprises a generally L-shaped member having an arm 190, extending along and secured to the lower portion of edge 72 of the magazine by screws 192 (FIGS. 1, 2 and 14), and an arm 194 which extends outwardly from such edge 72 to wall 74 of the recorder cavity, the vertical height of the guide 70 being less than the vertical height of the plate 107, as shown. The outer edge of arm 190 and the bevelled corner 195 (see FIG. 14) of the magazine have complementary interfitting notches 196 and 198, respectively. The lower surface 195 (FIG. 9) of arm 194 and lower surface of the portion of arm 190 adjacent thereto and axially aligned with groove 68 are flush with the ceiling of groove 68 (FIGS. 12 and 13) and hence are higher than the bottom surface of plate 107 which rests against the floor of the recorder cavity 4. The rest of the lower surface of arm 190 is flush with the bottom surface of plate 107 and rests on the floor of the recorder cavity, the shoulder between the two levels of the lower surface of the guide being shown at 200 in FIGS. 12 and 13 and being axially aligned with an edge of the groove 68, as shown in FIG. 12. The guide edge 202 of guide 70 is arcuate and extends at an angle to a line which is substantially transverse to the new direction imparted to the tape by the guide 70 through the passage between longitudinal edge 72 of the magazine and wall 74 of the recorder cavity (FIG. 1). This angle is approximately one-half the angle between the direction of tape travel through groove 68 to the guide and the new direction of tape travel. Thus, it is approximately one-half the angle between the longitudinal center line of groove 68 and the longitudinal edge 72 of the magazine. The last mentioned angle is acute and, in the embodiment shown in the drawings, is 37° so that the first mentioned angle is 18½°. These angular relationships insure smooth transport of the tape. Since the height of guide 70 is less than the height of plate 207 and it is located at the lower portion of the longitudinal edge 72 of the plate 107, there is adequate room between the top thereof and the cover plate 118 for free passage of the tape from guide edge 202 over the top of the guide to passage 71. Since the lower surface 195 (FIG. 9) of the guide traversed by the tape is flush with the ceiling of groove 68, there is also a space between such lower surface and the floor of the recorder cavity 4 for free passage of the tape from groove 68 under the guide and thence over guide edge 202. Guide edge 202 is spaced from the wall 197 (FIG. 1) of recorder cavity 4 to provide a space 199 therebetween. Arm 194 measured outwardly from the longitudinal edge 172 of the magazine is longer than the width of the tape. The width of passage 71 is also greater than the width of the tape.

Magazine 8 is greater in height than the magazine receiving portion 6 of the recorder cavity 4 by the thickness of the magazine cover plate 118, such cover plate being received in a recess 204 in the bottom of the recorder cover 56 to insure a tight fit between the top of recorder plate 1 and the recorder cover 56. The top of magazine plate 107 is flush with the top of recorder plate 1.

The guide bar 40 comprises an elongated flat bar 204 (FIG. 2) which extends along almost the entire length of the head-receiving cavity portion 32 of the recorder cavity 4. The bottom face of bar 204 rests flush on the floor of such cavity portion with a longitudinal edge abutting against the shoulder 206 formed by the difference in level between the head-receiving cavity portion 32 and the magazine-receiving portion 6 of the recorder cavity 4 and between the head-receiving portion 32 and the transport mechanism receiving portion 14 of the recorder cavity 4, with an end abutting against vertical wall 208 (FIG. 1) of the recorder cavity 4 and with the other end slightly spaced from the opposite vertical wall 74 of such recorder cavity. At each end of the above-mentioned shoulder 206 is a half-moon shaped recess 207, the floor of which is flush with the floor of the head-receiving portion 32 of the recorder cavity. The height of the bar 204 is such that it protrudes upwardly slightly beyond the floor of the magazine-receiving cavity portion 6 but the top is flush with the floor of the transport mechanism receiving portion 14 of the recorder cavity. The width of the bar 204 is such that it extends from the above-mentioned shoulder to the front walls of the head boxes 34, 36 and 38. The longitudinal edge thereof facing such boxes has a recess 209 opposite each of the heads for receiving the lower portions of the heads protruding out of the head boxes.

The two corner guides 42 and 44 are secured to the top of the bar 204 at its ends by means of inset screws 210. Each corner guide has the shape of a quarter segment. The arcuate tape guiding surface of each corner guide has a tape-receiving groove 212 (FIG. 2) extending circumferentially therearound. The tops of the corner guides are flush with the top of the main support plate and the top of the magazine plate 107.

Also secured to the top of bar 204 by means of inset screws 214 with their tops flush with the tops of the corner guides are two pressure pad supporting blocks 216 and 218. Block 216 has a recess in the front edge thereof extending from top to bottom of the block and facing the reproduce head 80. Pressure pad block 46 having a pressure pad 219 (FIG. 3) of felt or the like for engaging the tape is slidably received in such recess and a spring 222 biased between the rear wall of the recess and the pressure pad block 46 urges the pressure pad block out of the recess and toward the tape engaging face of the reproduce head to press the tape against such face as it moves by the face. The flat top of the pressure pad block 46 is approximately flush with the top of block 216 but enough clearance is provided between the top of such pressure pad block and the recorder cover plate 56 to permit free sliding of the block in its recess.

Block 218 has two such recesses for slidably receiving the pressure pad blocks 48 and 50, such blocks being spring biased toward the tape engaging surfaces of the erase and record heads, respectively, to press the tape against such surfaces as it moves over them.

The front vertical walls of blocks 216 and 218 are flush with the vertical walls forming the floors of the recesses 209 in the front edge of bar 204 and the rear vertical walls of the blocks are flush with the rear edge of bar 204 and abut against the magazine 8 and the ends of fences 28 and 30.

Also received in a recess in the front edge of block 218 with a guide portion thereof protruding from the recess is the guide 54, the tape contacting surface of which is arcuate and has a groove for receiving the tape. Guide 54 is secured to a non-recessed portion of the bar 204 under the recess in block 218, in which recess the guide is located, and extends beyond the front edge of block 218. The recess extends from top to bottom of block 218 and the height of guide 54 is equal to the height of the recess.

Figures 11, 17:
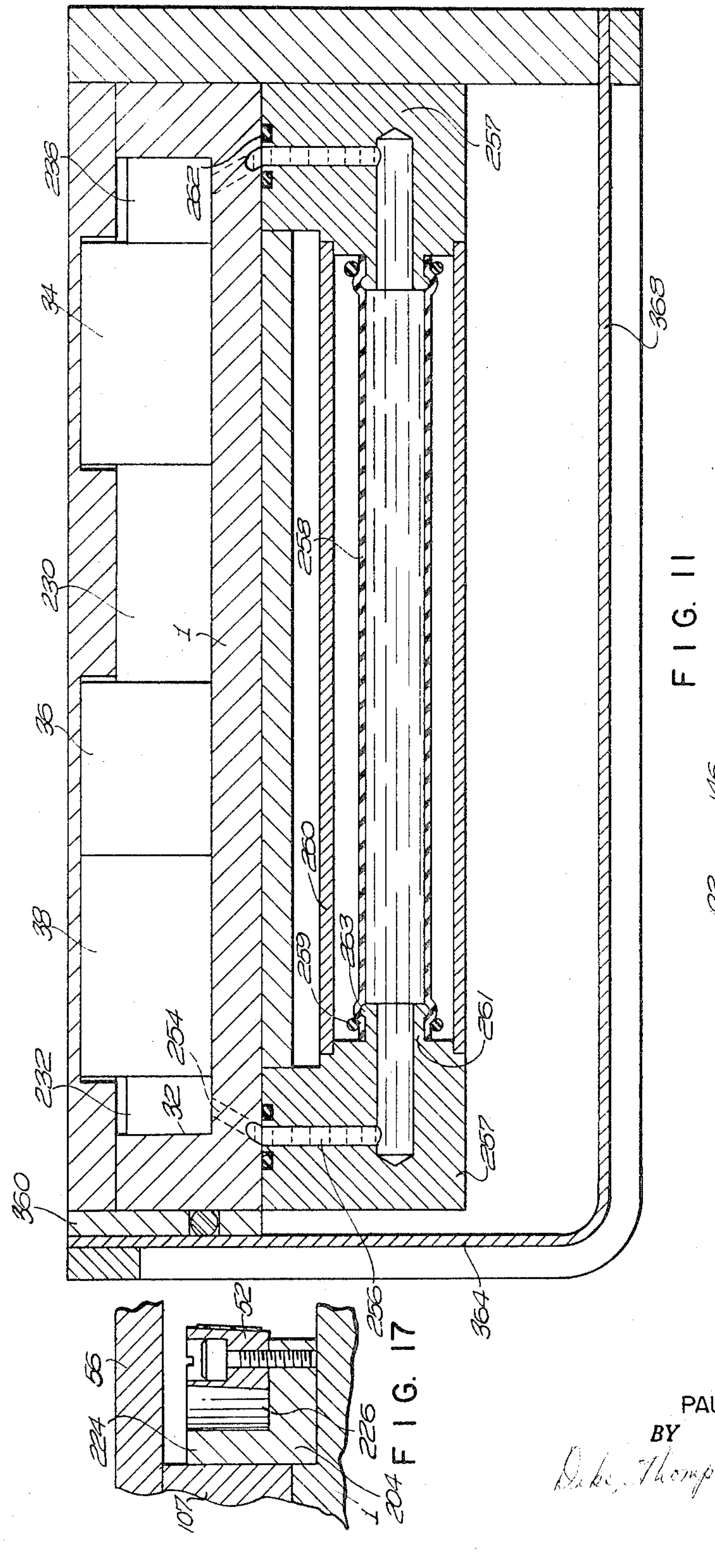
FIG. 11 is a section taken along the line 11—11 of FIG. 1.
FIG. 17 is a section taken along the line 17—17 of FIG. 1.

A block 224 rises integrally from the bar 204 between the blocks 216 and 218, the top of block 224 being flush with the tops of blocks 216 and 218. The vertical front wall of block 224 facing the tape passage between the guide bar 40 and the heads is bevelled at its ends, as shown, and comprises a tape guide surface. A centrally located recess 226 is provided in such wall of the block 224 and extends vertically from the top of the block to the level of the top of the bar 204. Mounted in this recess with a portion of the periphery thereof extending beyond the mouth of the recess is a tape guide 52 (FIG. 17) which comprises a cylinder, the ends of which are at an angle to the longitudinal center line of the cylinder and are parallel. The guide 52 is secured to the bottom of recess 226 with the lower end resting against such bottom by a screw extending through an aperture in a lower end wall of the cylinder. The periphery of guide 52 extends beyond the front edge of bar 204. Because of the angular relationship between the ends of the cylinder and the center line, by loosening the screw and turning the cylinder, the guide can be adjusted to protrude more or less from the mouth of recess 226 and beyond the tapered face of block 224 and the front edge of bar 204.

The corner guides 42 and 44 and the guides 52 and 54 tension the tape over the head surfaces.

The back vertical walls of the head boxes 34, 36 and 38 abut against the recorder cavity wall 233. The head boxes are removably secured to the floor of the recorder cavity. Corner spacer members 228 and 232 are secured to the recorder cavity floor between the cavity walls 74 and 208 and the reproduce and record head boxes, respectively, and a center spacer member 230 is secured to the cavity floor between the head boxes 34 and 36. The head boxes are slightly higher than the top of the plate 1 and the recorder cover plate 56 is provided with recesses 234 and 236 to receive them. The tops of the spacer blocks are at the same level as the top of plate 1. By the use of such head boxes, heads of different sizes can be interchanged without extensive modification of the recorder. The wiring 238 (FIGS. 3 and 4) for each head is coupled with a plug 240 having prongs 242, the plug being located in a stepped hub 244 extending downwardly from the bottom of the head box and received in a liquid-type manner by an O-ring or other sealing means in a stepped aperture through the floor of the recorder cavity, the prongs 242 being adapted to enter receptacles below the plate 1 and coupled with the electronic units. In this way, the heads are easily interchangeable.

Figure 18:
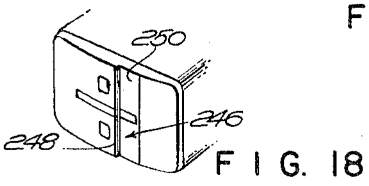
FIG. 18 is a view in perspective of the tape engaging face of one of the intelligence transmitting heads of FIG. 1.

The faces of the reproduce and record heads are arcuate in the direction of tape travel (FIG. 18). A centrally located recess 246 is milled in each of these faces, such recess extending across the vertical height of the face. The recess comprises a wall 248 which is perpendicular to the arcuate face and a wall 250 which forms an acute angle with the face so that the angle formed by wall 248 with the face is larger than that formed by wall 250. The intersection of wall 248 with the face is further along the path of tape travel than the intersection of the wall 250, the direction of tape travel being shown by an arrow in FIG. 18. Wall 250 is perpendicular to wall 248. Vertical tape deflector strips 252, attached to the front edges of blocks 216 and 218 and the front edges of the recessed portions of bar 204 opposite the intersections of walls 250 with the arcuate head surfaces, extend to such intersections and the portions of walls 250 adjacent to such intersections to deflect the tape against the intersections and such portions of walls 250. The pressure pads straddle the intersections of walls 248 with the head surfaces and lie opposite portions of the recesses adjacent to such intersections to thereby press the tape tightly against such intersections. The deflector plates 252 insure that the tape is under tension over the recesses. By this arrangement, a flow of liquid is set up in the recesses 246 by the longitudinal movement of the tape, which flow of liquid is effective to suck the tape against the head surfaces and destroys liquid film between the tape and surfaces, according to the theory of viscous fluids, as set forth in the above-mentioned copending applications Serial Nos. 678,503 and 678,732.

Inclined holes 254 (FIGS. 1 and 11) are located in the floor of the recorder cavity 4 (the head receiving portion) at the corners thereof adjacent the end spacers 228 and 232. These holes extend through the cavity floor and communicate with passages 256 (FIG. 11) in blocks 257 secured to the bottom of plate 1. Passages 256 communicate with the interior of a tube 258 of a flexible, resilient, elastic and expandable material such as latex, located in a metal cyclinder 260, to provide for thermal expansion of the liquid. An O-ring 262 is provided in a recess in each of the blocks 257 to insure a liquid-proof attachment of the blocks to the plate 1. Also, the connections between tube 258 and the blocks is liquid-proof and comprise clamps 259 clamping the ends of the tube around projections 261 of the blocks having beads 263.

The yoke 20 supporting the rotatable pressure roll 22 is secured to the floor of the transport mechanism receiving cavity portion 14 of the recorder cavity 4 for adjustment of the roll 22 toward and away from the capstan periphery 16 by means of two screws 265 (FIG. 1) extending through enlarged holes 94*a* (FIG. 2) in the arm 94 and threaded into the floor of the recorder cavity so that the pressure roll 22 can be moved away from the capstan periphery to thread the tape between the pressure roll and capstan and thereafter can be moved toward the capstan to press the tape tightly against the periphery thereof, in which latter position the yoke is secured to the floor of the recorder cavity by screws 265.

Pressure roll 22 is rotatably mounted between the forked portions 270 (FIGS. 1, 2, 4 and 5) of arm 24 of the yoke on a pin 268 mounted in and between such forked portions. The arm 94 of the yoke abuts against the longitudinal edge of fence 28. The height of the roll 22 is only slightly less than the height of the recorder cavity portion 14, the difference in height being enough to provide sufficient clearance between the pressure roll and cover plate 56 and between the roll and the floor of such cavity portion to permit free rotation of the roll. The arm 24 is greater in height than arm 94 in order to support roll 22 as aforesaid. It is also greater in height than cavity portion 14, the arm 94 being of the same height as such cavity portion. The bottom and top portions of the arm 24 of the yoke are received in elongated recesses 270 and 272 (FIGS. 1 and 5) in the floor of recorder cavity portion 14 and in the cover plate 56 respectively.

Adjustable stop member 26 (FIG. 1) secured to the floor of recorder cavity portion 14 limits the movement of the yoke and pressure roll 22 toward the capstan. The arm 24 abuts against an adjustment screw 274 (FIG. 1) threaded into the stop member 26.

The slidable and rotatable idler roll 18 (FIGS. 1, 2 and 4) comprises an aluminum cylinder 276 (FIG. 4) having a web 278 joining the cylinder to a hollow center hub 280 having a brass bushing 281 press fitted therein for rotatably receiving the floating pin 98. The ends of pin 98 are received in half-moon shaped cavities 282 and 284 in the floor of the recorder cavity portion 14 and in the cover plate 56 respectively. The half-moon shaped cavities are obtained by the use of round cavities having half-moon shaped plugs 286 secured therein so that the bearing edges 288 of the plugs are at about a 45° angle to the line through the pins 126 of the reels 10 and 12. Consequently, the floating pin 98 is free to slide in the half-moon shaped cavities to move the idler roll 18 toward and away from the capstan periphery by the moving tape wrapped around the roll. The hub 280 and bushing 281 are slightly greater in height than the rest of the roll so as to present bearing end surfaces for rotation of the roll. The cylinder 276 is filled with a plastic material sold under the trade name "Araldite" by Ciba Company. The plastic portions of reels 10 and 12 are made of the same material.

Figures 9, 10:
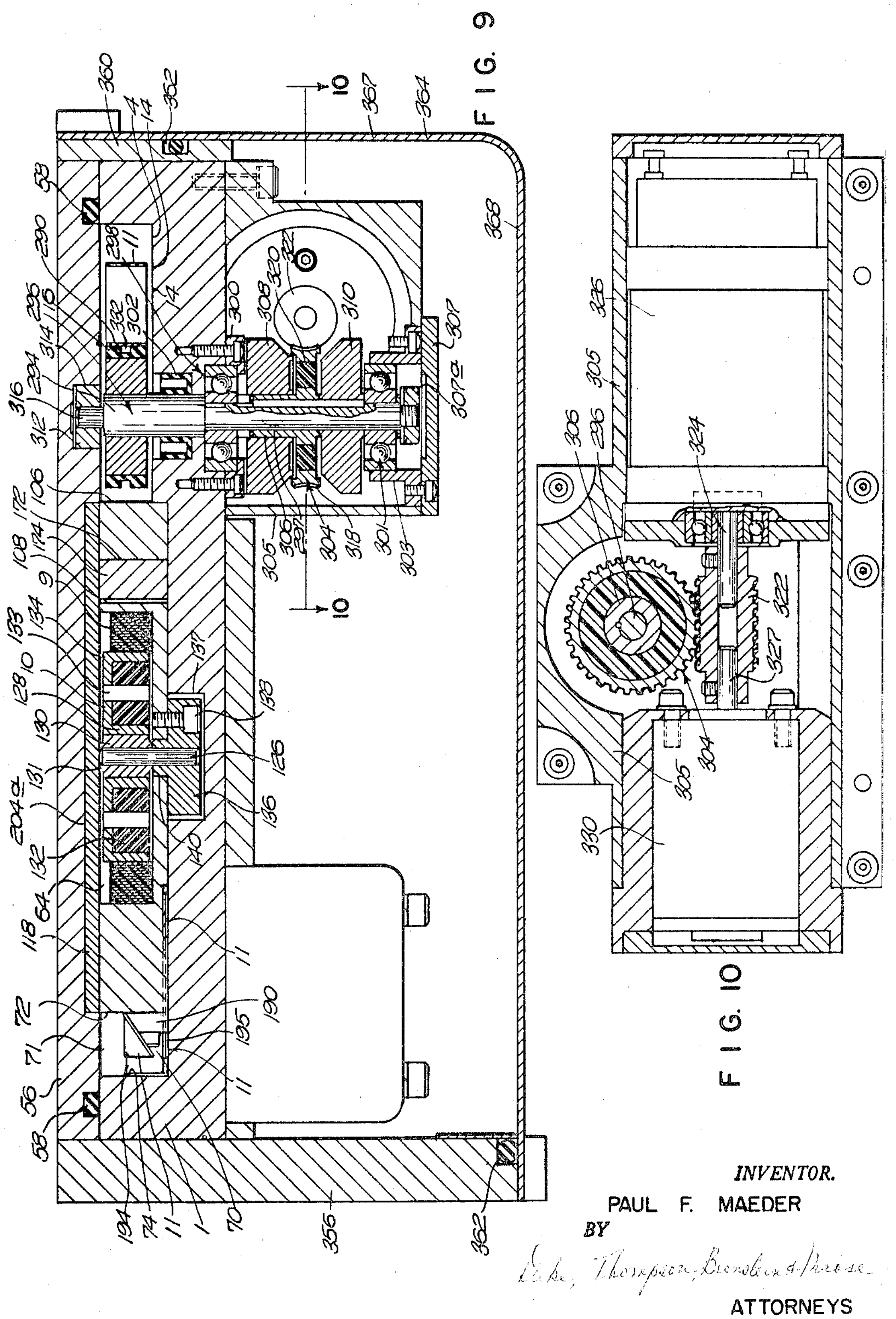
FIG. 9 is a section taken along the line 9—9 of FIG. 1.
FIG. 10 is a section taken along the line 10—10 of FIG. 9.

The capstan 16 (FIGS. 1 and 9) has a rubber tire 290 around its periphery. The tire has parallel slits extending thereacross from top to bottom, as described in the above-mentioned copending applications Serial Nos. 678,503 and 678,732, to destroy liquid film between the capstan periphery and the tape. The capstan wheel 16 is press fitted over an enlarged portion 294 of vertical capstan shaft 296 so that rotation of the shaft rotates the capstan. An end of enlarged portion 294 of the capstan shaft extends above the top of the capstan wheel, as shown in FIG. 9, and the bottom of the capstan wheel is spaced slightly above the floor of the recorder cavity portion 14, the height of the capstan wheel being slightly less than the height of the cavity portion 14. The capstan shaft extends downwardly through a hole in the floor of the recorder cavity portion 14 and is rotatably mounted on support plate 1 at a reduced diameter portion 297 of the shaft by means of a ball bearing assembly 298 secured in a recess at the bottom of the plate 1 by retainer plate 300, and a second ball bearing assembly 301 slidably mounted in a bushing 303 which is secured to a gear and motor box 305 rigidly mounted on the bottom of plate 1 and which is covered by a cover plate 307. Engagement of the shoulder formed by the juncture of the enlarged and reduced portions of the capstan shaft, with the inner race of the ball bearing assembly 298 limits downward movement of the shaft and capstan carried by the shaft. The capstan shaft extends through a liquid seal 302 located in a recess in the floor of recorder cavity portion 14. A gear 304 having an elongated hub 306 is keyed to the reduced diameter portion of the capstan shaft below the plate 1, as shown in FIG. 9. A fly wheel 308 is press fitted over the elongated portion of the hub 306 above the gear, and a second fly wheel 310 is keyed to the shaft below the gear, the two fly wheels and gear hub 306 rotating as a unit with the capstan shaft and forming therewith a relatively heavy inertia mass. The upper reduced end 316 of the shaft is rotatably received in a bushing 312 pressed into a recess 314 in the cover plate 56 as shown.

The gear 304 comprises, in addition to the hub 306, an outer peripheral tooth portion 318, which is coupled to the hub portion 306 by a resilient, elastic rubber ring 320. The rubber is bonded to the gear hub 306 and the peripheral gear portion 318.

The gear 304 is driven by a worm gear 322 (FIGS. 9 and 10) which is driven by motor shaft 324 of motor 326 mounted in the motor and gear box 305. The worm gear 322 is also secured to the shaft 327 of a conventional tachometer-generator speed governor 330 which is mounted in box 305 and is coupled to the motor by a feedback arrangement which is responsive to changes in motor speed to keep the motor speed and hence the capstan speed constant.

The high inertia mass formed by the fly wheels 308 and 310, the capstan shaft and the gear hub, in combination with the resilient, elastic coupling between such mass and the motor shaft, dampens frequencies of the motor shaft above a certain cutoff frequency caused by fluctuating speed changes produced by the speed governor to thereby eliminate noise caused by such frequencies.

When the shoulder formed by portions 294 and 297 of the capstan shaft abuts against the inner race of assembly 298, as shown in FIG. 9, the shoulder formed by portions 294 and 316 of the shaft is spaced slightly from the lower surface of bushing 312 in the cover plate 56 so that the shaft, together with the gear 304, fly wheels 308 and 310 and bearing assembly 301 attached thereto by means of nut 307*a*, has a small amount of vertical play due to the slidable nature of the bearing assembly 301.

Pressure roll 22 and capstan 16 each has a central groove 332 (FIGS. 2, 4, 5 and 9) extending circumferentially around the periphery thereof. Portion 334 (FIGS. 1, 4 and 5) of an end edge of fence 28 adjacent pressure roll 22 has an arcuate shape to accommodate the pressure roll. A thin piece 336 extends from such arcuate edge of fence 28 into the groove 332 in the pressure roll periphery to peel tape from the roll. Portion 337 (FIG. 1) of the edge of fence 31 adjacent capstan 16 is also arcuate to accommodate the periphery of the capstan 16. It too has a thin projection 338 extending into the circumferential groove 332 in the capstan periphery to peel tape from the capstan beyond the nip of the capstan and pressure roll 22. The edge of fence 31 has another arcuate portion 340 opposite the pressure roll 22 and accommodating the roll. The arcuate portion 340 forms with the opposed curved edge 342 of fence 28 (FIG. 1) a passage 345 through which the tape moves from the nip of capstan 16 and roll 22 into the expansion chamber 100.

An angular shaped protrusion 346 extends from the fence 30 into the expansion chamber prior to entry of the slack tape into the slit 102 to provide tension on the tape and prevent jamming. If desired, a pin 348 can be mounted in the floor of the expansion chamber to increase such tension, the tape being moved from between the pin and the wall of the expansion chamber over the protruding part 346.

The angular relation of the slits 102, 104 and 108 changes the direction of the tape moving through the slits to provide tension on the tape before it returns to the bundle.

The tops of the fences are flush with the top of plate 1.

Figure 3:
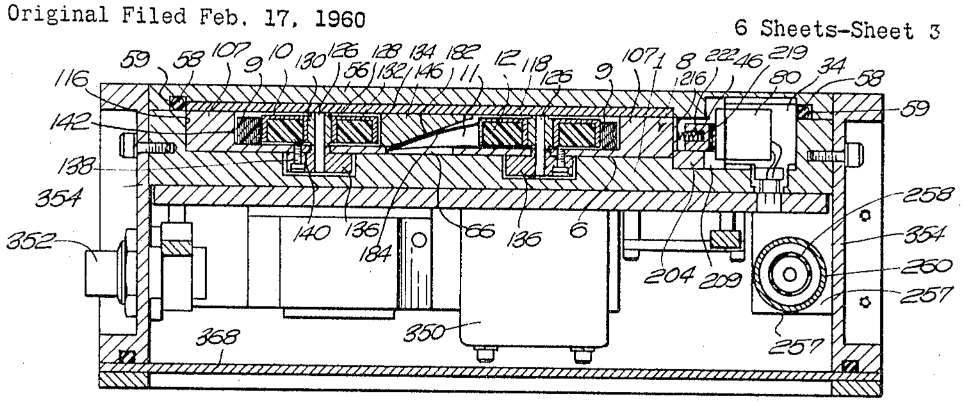
FIG. 3 is a section taken along the line 3—3 of FIG. 1.
Figure 4:
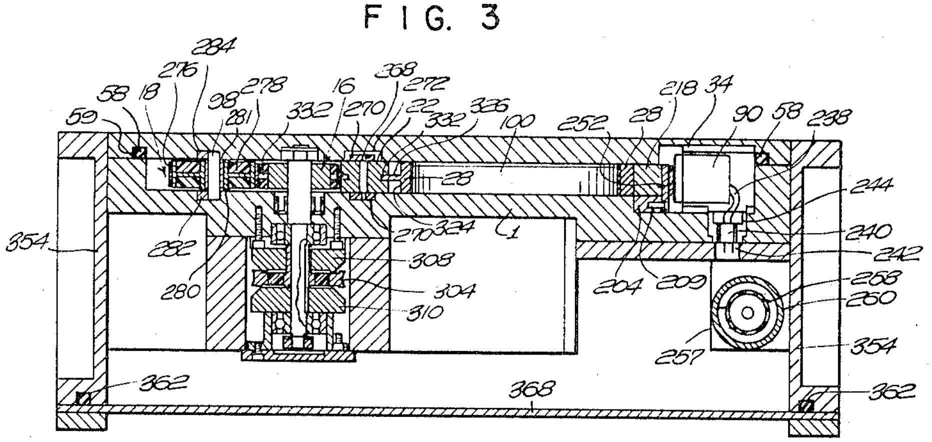
FIG. 4 is a section taken along the line 4—4 of FIG. 1.

The electronic units are mounted on the bottom of plate 1 in a plurality of boxes 350 (FIG. 3). The wiring enters the recorder through well 352.

Plate 1 and the cavity therein as well as the electronic units mounted below it are enclosed by two vertical side plates 354 and a vertical end plate 356, which are secured to the plate by means of threaded screws extending through holes 358 (FIG. 2) in the side and end plates into threaded apertures in three vertical edges of the plate 1. The plate 1 is located below the tops of the side and end plates just enough so that the top of the cover plate 56 is flush with the tops of the side and end plates when it is secured to plate 1.

The fourth edge of plate 1 has a strip 360 secured thereto, the outer face of which has a groove 362 (FIG. 9) extending lengthwise from end to end thereof. Such outer face is flush with the end edges of side plates 354 (FIG. 1). The groove 362 connects with vertical grooves 362 in such end edges of the side plates 354, which vertical grooves continue around and along the bottom edges of such side plates (FIGS. 3 and 4) and lengthwise across the bottom edge (FIGS. 5 and 9) of the end plate 356.

An L-shaped cover plate 364 having a vertical wall 367 and a horizontal wall 368 (FIG. 9) is secured to the above mentioned face of strip 360, the end and bottom edges of side plates 354 and the bottom edge of end plate 356. Cover plate 364 covers the bottom and the end of the recorder opposite from end plate 356 and tightly presses an O-ring in the groove 362 to seal the interior of the recorder, including the electronic units below the plate 1. It is noted that the top edge of strip 360 is flush with the top edges of the side plates and end plate and the top edge of the vertical wall 367 of the cover plate.

When the recorder is assembled, the magazine cavity with the tape bundle therein is filled with liquid after which the top plate 118 is secured thereto and the magazine is secured in the recorder cavity. Thereafter, the tape is threaded between the pressure roll 22 and capstan 16 by movement of yoke 20, and the cover plate 56 is secured to the top of the plate 1. Thereafter the recorder is turned on its edge with holes 370 (FIG. 1) facing upwardly. These holes extend through the wall 367 of the cover plate, the strip 360 and through the plate 1 into the recorder cavity 4. Liquid is poured into one of the holes until it flows out of the other hole thereby indicating that cavity 4 is completely filled with liquid. The holes are thereafter sealed off. The entire cavity in plate 1 is full of the liquid so that all the parts located in such cavity are fully immersed in the liquid. The magazine plate 107 and its cover member 118 are not sealed so that liquid can seep into the magazine cavity 64 from the recorder cavity 4. Thus, the entire tape including the bundle is fully immersed in the liquid as well as the entire transport mechanism, the guides and the head boxes.

The specific gravity of the liquid closely approximates, and preferably is equal to, the specific gravity of the tape and reels 10 and 12 and idler roll 18 to reduce inertia effects thereon. The combination of plastic and aluminum in the reels 10 and 12 and the idler roll 18 are proportioned so that they have about the same specific gravity as the tape and liquid. Suitable liquids are referred to in the above-mentioned copending applications.

The term "tape," as used herein, shall have the same meaning as it has in said copending applications and includes wire, photographic film and tapes of any shape and material.

The reels 10 and 12 may be stationary. In such case, the center barrier and reels may form a single unit and be in one piece.

The terms "top," "bottom," "lower," "upper," "vertical," "horizontal," "floor" and "ceiling" are used herein only for the purpose of aiding in describing the relative positions of the parts of the recorder in the attitude shown in the drawings. It is not intended that the invention be limited in any way by such terms. The recorder of the present invention is operable, and is intended for use, at all attitudes, in some of which attitudes what is the "top," "upper," "vertical," or "ceiling" in the accompanying drawings becomes the "bottom," "lower," "horizontal" or "floor" and vice versa.

I claim:

1. A transducing head for a data storage mechanism having a tape contacting surface, said surface having a recess extending across its face transversely to the direction of tape travel, the walls of said recess forming with the tape a fluid flow passage, one side of which is formed by the tape, the leading end of said one side with respect to the movement of the tape forming with a first wall of said recess adjacent said leading end a first angle, the trailing end of said one side with respect to the movement of the tape forming with a second wall of said recess adjacent said trailing end a second angle which is substantially smaller than said first angle whereby said passage diverges in the direction from the trailing end to the leading end thereof and the flow of fluid from the trailing end of said passage to the leading end thereof caused by said tape movement creates a suction on said tape.

2. A head according to claim 1, said first angle being at least about 90°, said second angle being acute.

3. A head according to claim 2, including means for placing said tape under tension over and against said surface.

4. In a non-tape driving part for a data storage mechanism which has a tape contacting surface past which the tape is moved and which is contacted by the moving tape, the improvement comprising a recess extending across said surface transversely to the direction of tape travel, the walls of said recess forming with the tape a fluid flow passage, one side of which is formed by the tape, the leading end of said one side with respect to the movement of the tape forming with a first wall of said recess adjacent said leading end a first angle, the trailing end of said one side with respect to the movement of the tape forming with a second wall of said recess adjacent said trailing end a second angle which is substantially smaller than said first angle whereby said passage diverges in the direction from the trailing end to the leading end thereof and the flow of fluid from the trailing end of said passage to the leading end thereof caused by said tape movement creates a suction on said tape.

References Cited by the Examiner

UNITED STATES PATENTS

| | | | |
|---|---|---|---|
| 2,945,697 | 7/1960 | Maeder | 274—11 |
| 3,151,796 | 10/1964 | Lipschutz | 179—100.2 |

FOREIGN PATENTS

| | | |
|---|---|---|
| 504,932 | 4/1939 | Great Britain. |

NORTON ANSHER, *Primary Examiner.*

C. B. PRICE, *Assistant Examiner.*